US012338964B2

(12) United States Patent
Jin

(10) Patent No.: US 12,338,964 B2

(45) Date of Patent: Jun. 24, 2025

(54) LAMP FOR VEHICLE

(71) Applicant: HYUNDAI MOBIS CO., LTD., Seoul (KR)

(72) Inventor: Min Ji Jin, Yongin-si (KR)

(73) Assignee: HYUNDIA MOTOR CO., LTD., Seoul (KR)

( * ) Notice: Subject to any disclaimer, the term of this patent is extended or adjusted under 35 U.S.C. 154(b) by 0 days.

(21) Appl. No.: 18/509,949

(22) Filed: Nov. 15, 2023

(65) Prior Publication Data

US 2025/0060081 A1 Feb. 20, 2025

(30) Foreign Application Priority Data

Aug. 17, 2023 (KR) ........................ 10-2023-0107797

(51) Int. Cl.

*F21S 41/265* (2018.01)
*F21S 41/143* (2018.01)
*F21S 41/27* (2018.01)
*F21S 41/43* (2018.01)

(52) U.S. Cl.

CPC ........... *F21S 41/265* (2018.01); *F21S 41/143* (2018.01); *F21S 41/27* (2018.01); *F21S 41/43* (2018.01)

(58) Field of Classification Search

CPC ........ F21S 41/265; F21S 41/27; F21S 41/143; F21S 41/43

See application file for complete search history.

(56) References Cited

U.S. PATENT DOCUMENTS 11,293,614 B2 * 4/2022 Moser ..................... F21S 41/43
12,013,093 B2 * 6/2024 Muramatsu ............. F21S 41/27

* cited by examiner

*Primary Examiner* — Matthew J. Peerce

(74) *Attorney, Agent, or Firm* — DLA PIPER LLP US

(57) ABSTRACT

A lamp for a vehicle includes a first optical module that forms a first light distribution pattern, and including a first light source part, and a first output lens part that outputs light input from the first light source part, and a second optical module that forms a second light distribution pattern having light distribution characteristics that is different from those of the first light distribution pattern, and including a second light source part, and a second output lens part that outputs light input from the second light source part. The first optical module and the second optical module are arranged in an upward/downward direction, the first light distribution pattern and the second light distribution pattern overlap each other to implement a low beam.

5 Claims, 16 Drawing Sheets

10

LAMP FOR VEHICLE

CROSS-REFERENCE TO RELATED APPLICATION

This application claims the benefit of priority to Korean Patent Application No. 10-2023-0107797, filed in the Korean Intellectual Property Office on Aug. 17, 2023, the entire contents of which are incorporated herein by reference.

TECHNICAL FIELD

The present disclosure relates to a lamp for a vehicle.

BACKGROUND

In general, a vehicle is provided with various kinds of lamps having lighting functions for helping easily identify an object that is located near the vehicle during a nighttime driving, and signal functions for informing other vehicles or road users of a driving state of the vehicle.

Among the lamps for a vehicle, headlamps that form low beam patterns or high beam patterns to secure a front field of view of the driver during nighttime driving play an important role in safety driving. Furthermore, in recent years, importance of differentiation of designs of the headlamps is increasing.

In recent years, to differentiate designs of lamps of a vehicle, a lamp for a vehicle for implementing a lighting image of a line shape instead of a lighting image of a shape, in which a plurality of dots are arranged has been developed.

However, there is a limit in implementing a lighting image having a line shape with a conventional separated optical module and structure. In particular, it is difficult to implement an optical system having a continuous image with no intermittent texture in a lighting state when the conventional technology is used.

In particular, according to an optical module that implements a wide zone of a low beam, it may be difficult to implement a light distribution performance and a uniform light emission image of a light output surface at the same time. Then, when a design is made to satisfy the light distribution performance, the light emission image is not uniform whereby intermittence textures may be caused in an entire area of an output surface of the lamp for a vehicle. Accordingly, it is necessary to improve a technology for enhancing a light emission distribution uniformity of a light output surface while satisfying an optical performance.

SUMMARY

The present disclosure has been made to solve the above-mentioned problems occurring in the prior art while advantages achieved by the prior art are maintained intact.

An aspect of the present disclosure provides a lamp for a vehicle that forms a lighting image having a continuous image with no intermittent texture in a lighting state.

Another aspect of the present disclosure provides a lamp for a vehicle that secures differentiation of design, and thus increases a competitiveness of the product.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a first optical module that forms a first light distribution pattern, and including a first light source part, and a first output lens part that outputs light input from the first light source part, and a second optical module that forms a second light distribution pattern having light distribution characteristics that is different from those of the first light distribution pattern, and including a second light source part, and a second output lens part that outputs light input from the second light source part, the first optical module and the second optical module are arranged in an upward/downward direction, the first light distribution pattern and the second light distribution pattern overlap each other to implement a low beam, and a distance from the second output lens part to a vertical focus of the second output lens part is smaller than a distance from the first output lens part to a vertical focus of the first output lens part.

The first output lens part may include a first input surface, to which the light is input, and a first output surface from which the light is output, the second output lens part may include a second input surface, to which the light is input, and a second output surface, from which the light is output, the first output lens part and the second output lens part may be integrally formed in the upward/downward direction, and the first output surface and the second output surface may include multi-facet lenses, respectively.

A horizontal focus of the second output lens part may be formed in an interior of the second output lens part.

The second input surface may include a plurality of unit input surfaces, the plurality of unit input surfaces may be arranged along a leftward/rightward direction, and, on a horizontal cross-section of the second output lens part, each of the unit input surfaces may have a curved shape that is convex in a direction facing the second light source part.

The plurality of unit input surfaces may have the same shape.

Curvatures of the unit input surfaces may be formed such that an output angle of the light output from the second output surface is ranges from 30 degrees to 90 degrees.

The first optical module may further include a first shield part provided between the first light source part and the first output lens part, and that shields a portion of the light, the second optical module may further include a second shield part provided between the second light source part and the second output lens part, and that shields a portion of the light, and each of the first shield part and the second shield part may have a shape corresponding to a cut-off line of the low beam.

The lamp may further include a third optical module that forms a third light distribution pattern, and including a third light source part, and a third output lens part that outputs a light input from the third light source part, the third light distribution pattern may have light distribution characteristics that are different from those of the first light distribution pattern and the second light distribution pattern, and implements a high beam, the third optical module may be arranged in the upward/downward direction, together with the first optical module and the second optical module, and the third output lens part may be integrally formed with the first output lens part and the second output lens part.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments that will be described below are embodiments that are suitable for helping understand the technical features of a lamp for a vehicle according to the present disclosure. However, neither the present disclosure is limited to be applied by the embodiments described below nor the technical features of the present disclosure are restricted by the described embodiments, and the present disclosure may be variously modified within the technical scope of the present disclosure.

Figure 1:
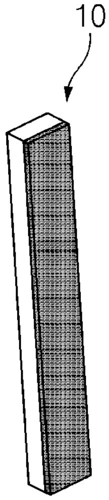
FIG. 1 is a perspective view illustrating a lamp for a vehicle according to an embodiment of the present disclosure.
Figure 2:
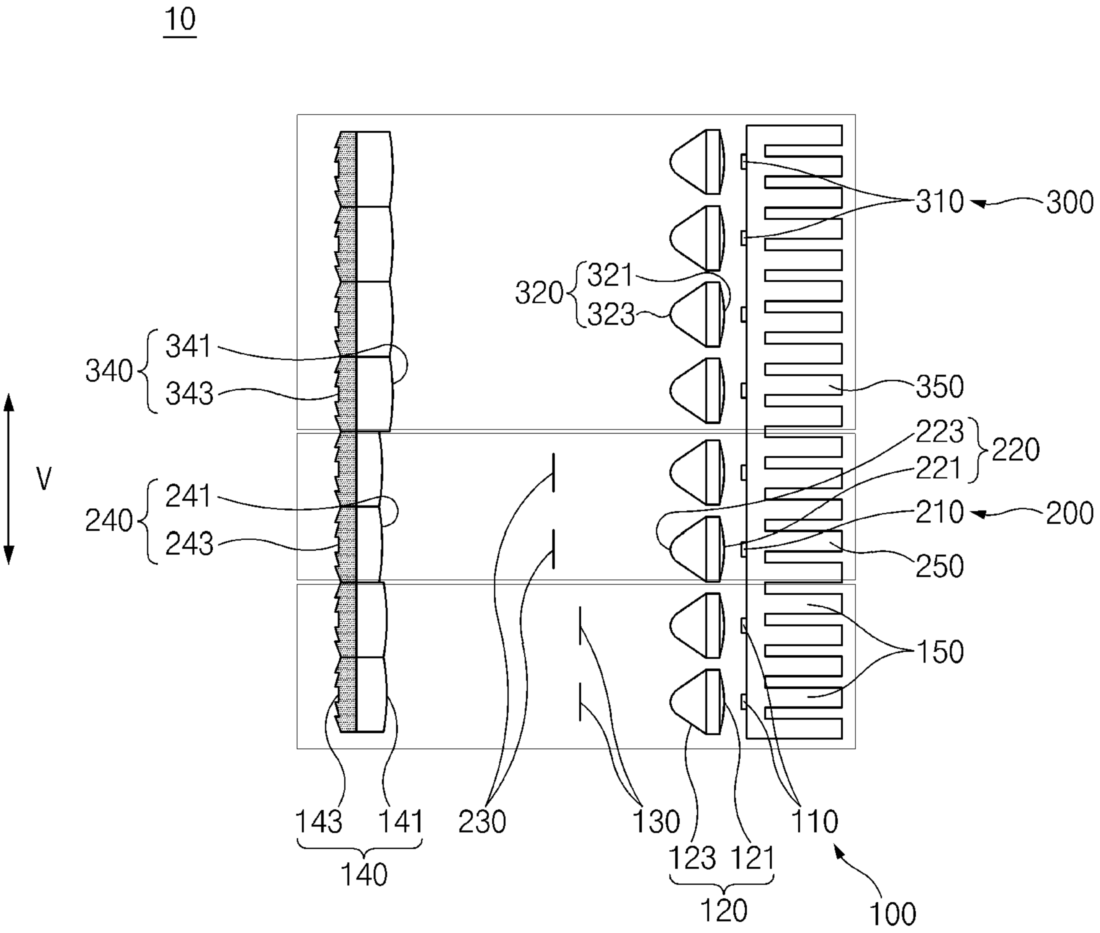
FIG. 2 illustrates a lamp for a vehicle according to an embodiment of the present disclosure, and illustrates a side surface of a lamp for a vehicle.
Figure 3:
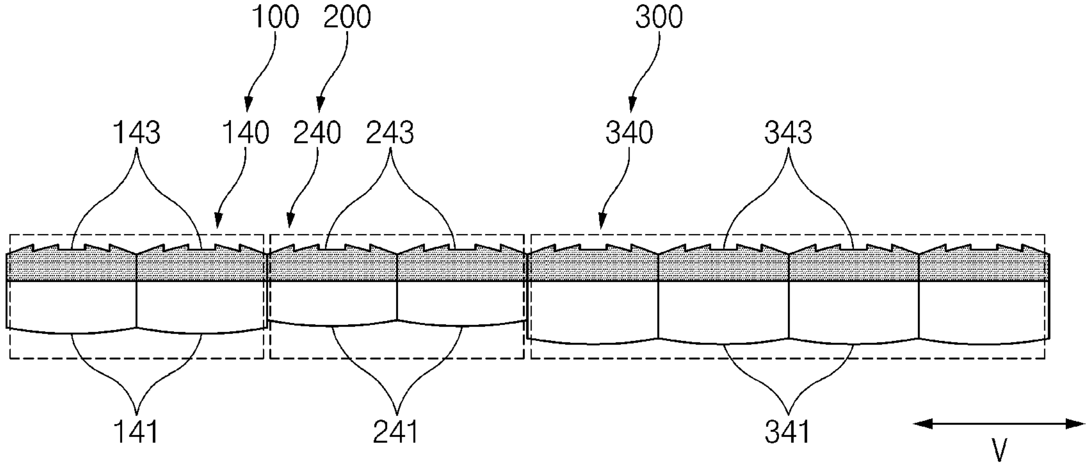
FIG. 3 is a side view a first output lens part, a second output lens part, and a third output lens part, when viewed from one side in a leftward/rightward direction, according to an embodiment of the present disclosure.
Figure 4:
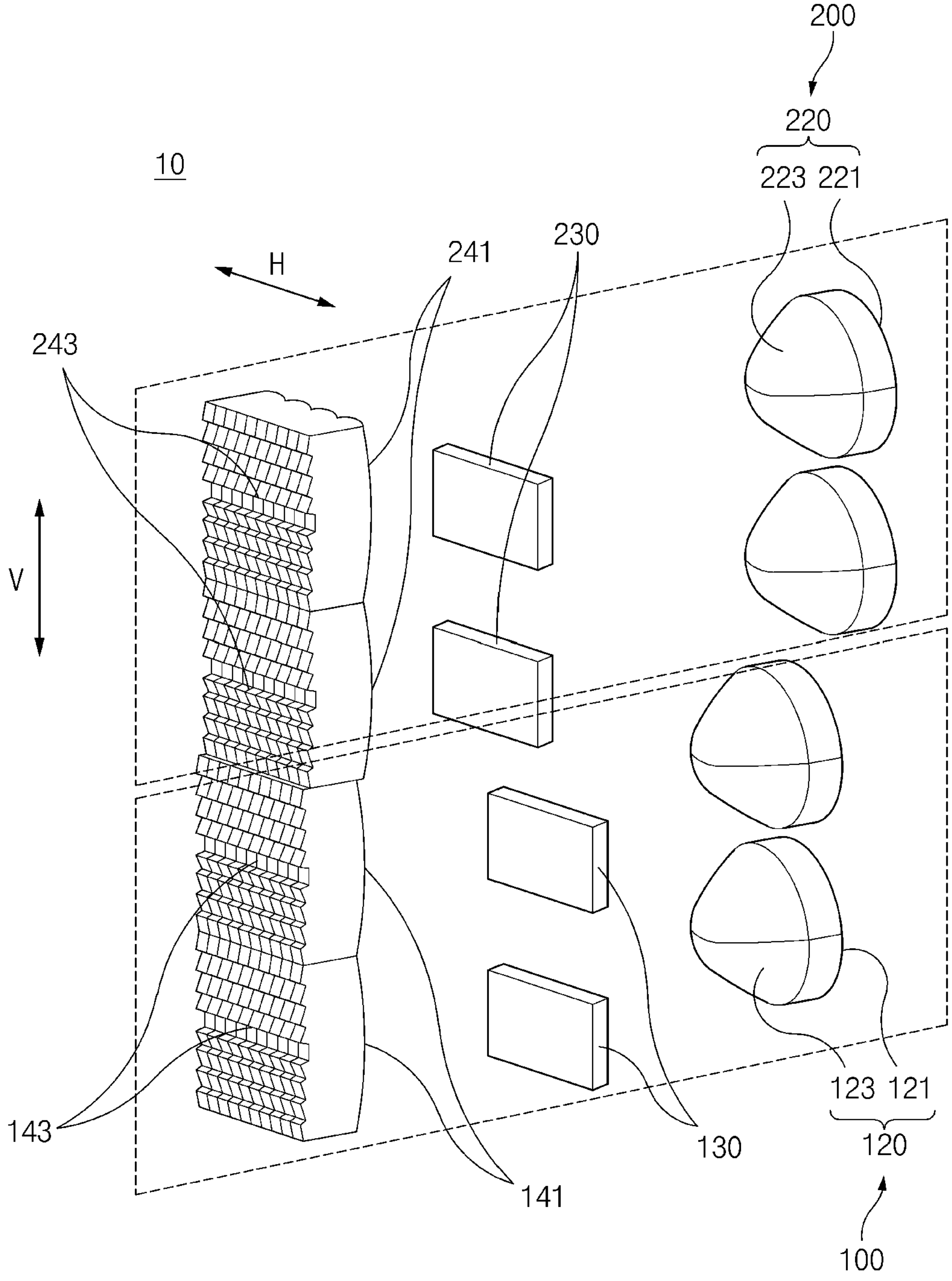
FIG. 4 is a perspective view illustrating a first optical module and a second optical module according to an embodiment of the present disclosure.
Figure 5:
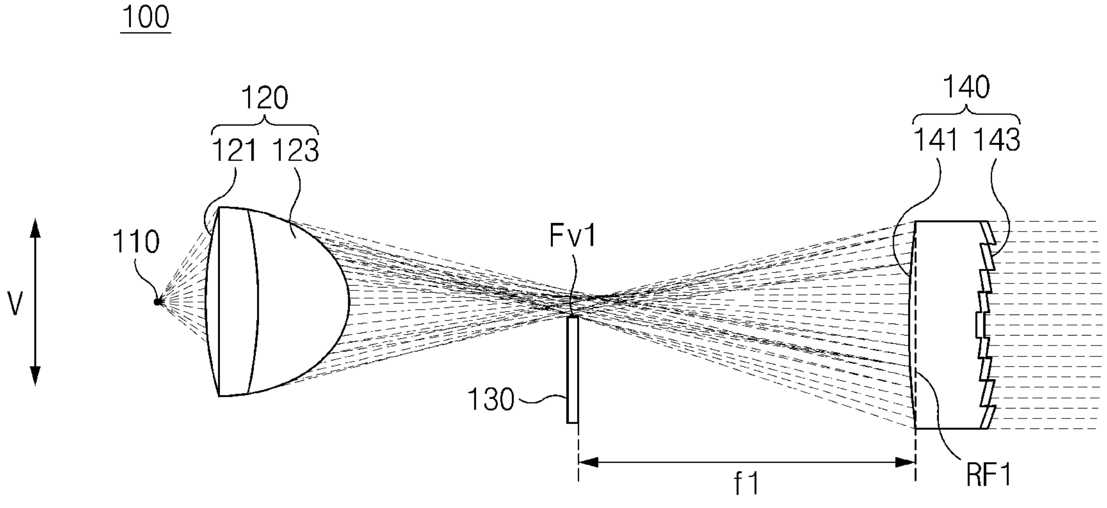
FIG. 5 is a side view of a first optical module, when viewed from one side in a leftward/rightward direction, and an optical path, according to an embodiment of the present disclosure.
Figure 6:
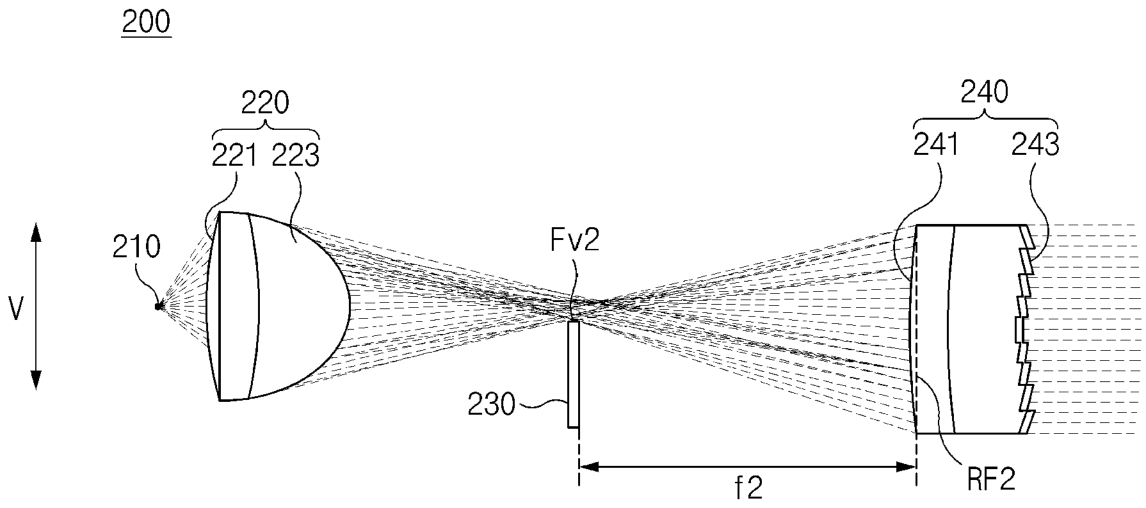
FIG. 6 is a side view of a second optical module, when viewed from one side in a leftward/rightward direction, and an optical path, according to an embodiment of the present disclosure.
Figure 7:
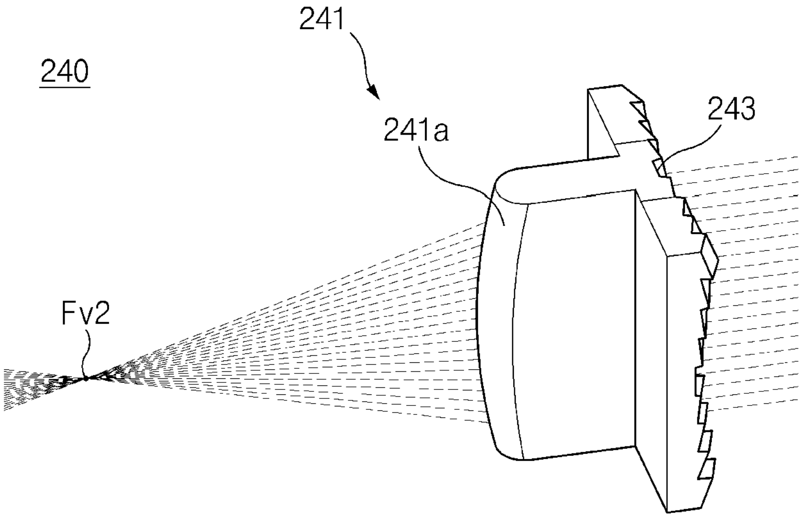
FIG. 7 illustrates a second output lens part according to a second output lens part according to an embodiment of the present disclosure, and is a view illustrating a unit input surface and a vertical optical path.
Figure 8:
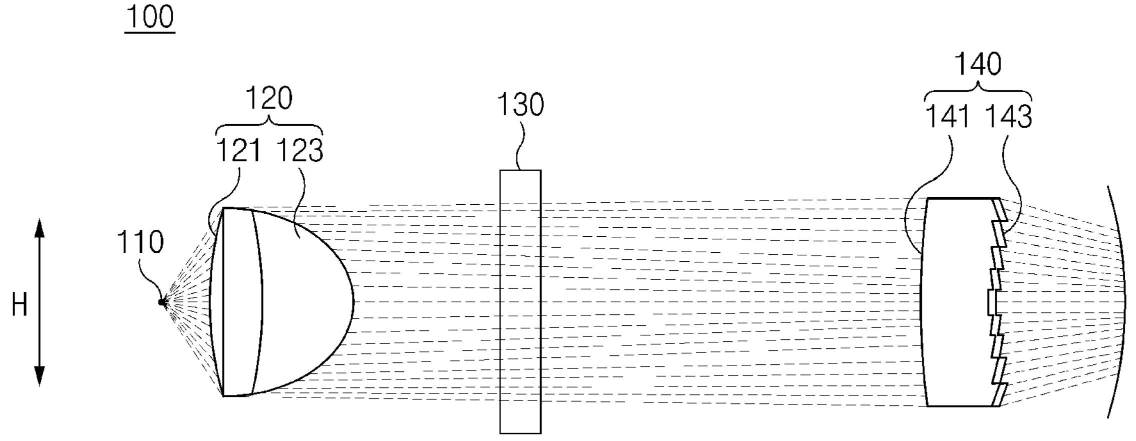
FIG. 8 is a view illustrating a plan view of a first optical module, when viewed from a top, and an optical path, according to an embodiment of the present disclosure.
Figure 9:
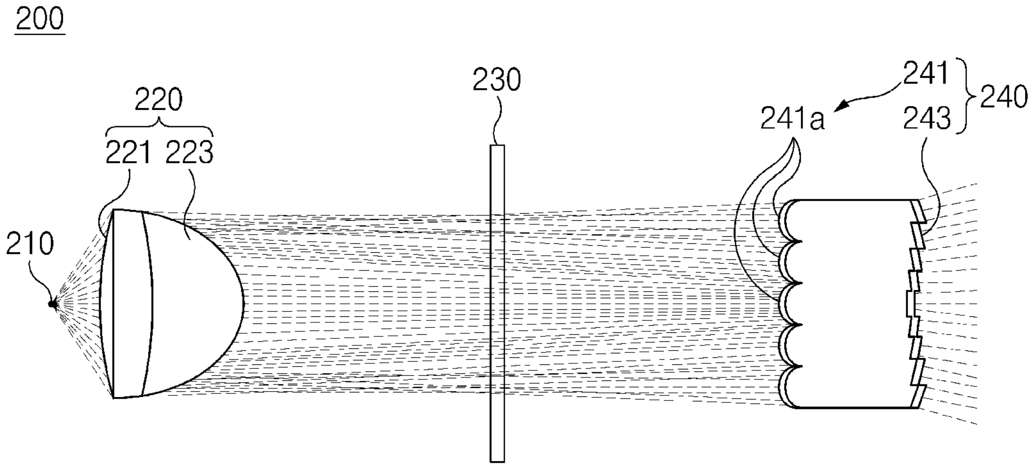
FIG. 9 is a view illustrating a plan view of a second optical module, when viewed from a top, and an optical path, according to an embodiment of the present disclosure.
Figure 10:
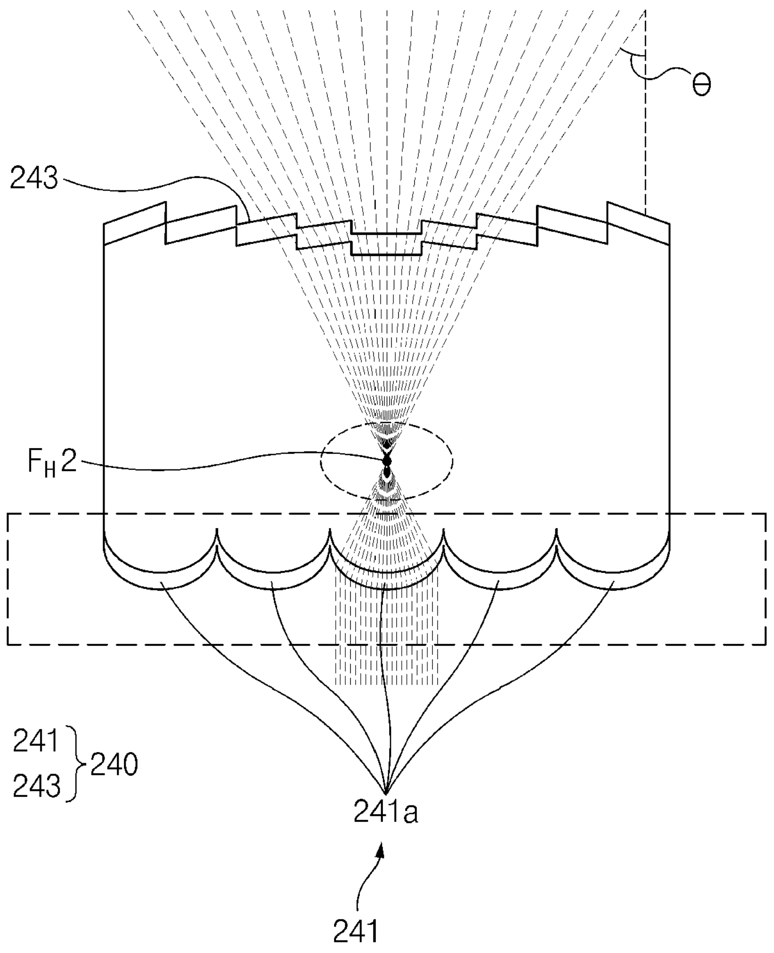
FIG. 10 is a plan view of a second output lens part, when viewed from a top, and a path of light that passes through a unit input surface, according to an embodiment of the present disclosure.

FIG. 1 is a perspective view illustrating a lamp for a vehicle according to an embodiment of the present disclosure, FIG. 2 illustrates the lamp for a vehicle according to an embodiment of the present disclosure, and illustrates a side surface of the lamp for a vehicle, FIG. 3 is a side view a first output lens part, a second output lens part, and a third output lens part, when viewed from one side in a leftward/rightward direction, according to an embodiment of the present disclosure, FIG. 4 is a perspective view illustrating a first optical module and a second optical module according to an embodiment of the present disclosure, FIG. 5 is a side view of the first optical module, when viewed from one side in a leftward/rightward direction, and an optical path, according to an embodiment of the present disclosure, FIG. 6 is a side view of the second optical module, when viewed from one side in a leftward/rightward direction, and an optical path, according to an embodiment of the present disclosure, FIG. 7 illustrates a second output lens part according to a second output lens part according to an embodiment of the present disclosure, and is a view illustrating a unit input surface and a vertical optical path, FIG. 8 is a plan view illustrating a plan view of the first optical module, when viewed from a top, and an optical path, according to an embodiment of the present disclosure, FIG. 9 is a view illustrating a plan view of the second optical module, when viewed from a top, and an optical path, according to an embodiment of the present disclosure, and FIG. 10 is a plan view of a second output lens part, when viewed from a top, and a path of light that passes through a unit input surface, according to an embodiment of the present disclosure.

Figure 11:
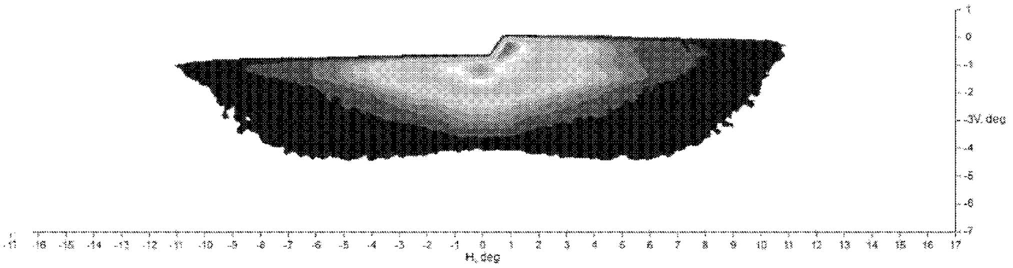
FIG. 11 is a view illustrating a light distribution image (an upper side) by a first optical module, and a light emission image (a lower side) of a first output lens part according to an embodiment of the present disclosure.
Figure 11:
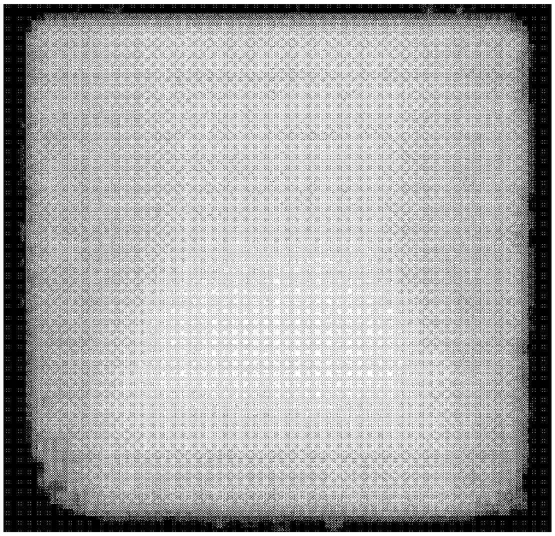
Figure 12:
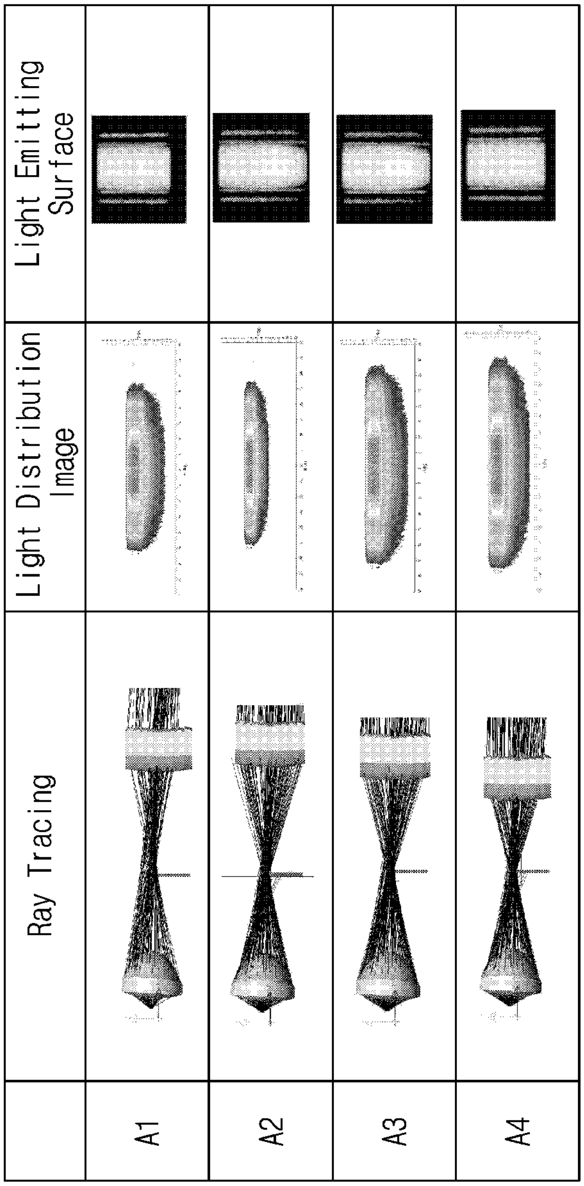
FIG. 12 is a table representing ray tracing, a light distribution image, and a second light emitting surface image according to a second vertical focal distance f2.
Figure 13:
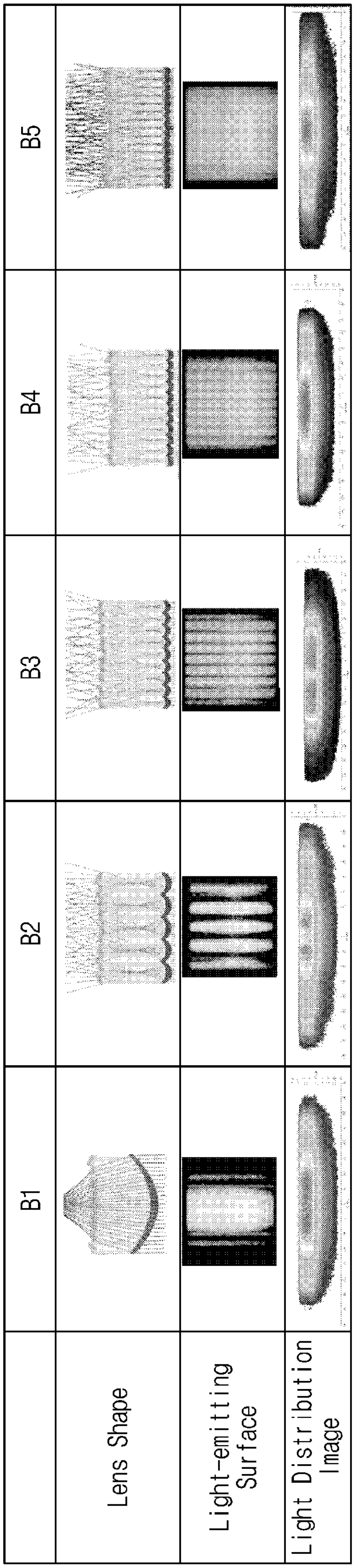
FIG. 13 is a table representing ray tracing, a second light emitting surface image, and a light distribution image according to a shape of a second input surface.
Figure 14A:
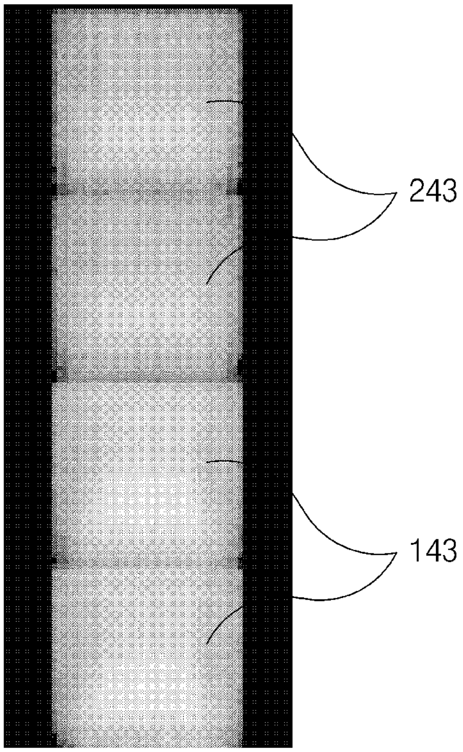
FIG. 14A is a view illustrating light emission images of a first output surface and a second output surface according to an embodiment of the present disclosure.
Figure 14B:
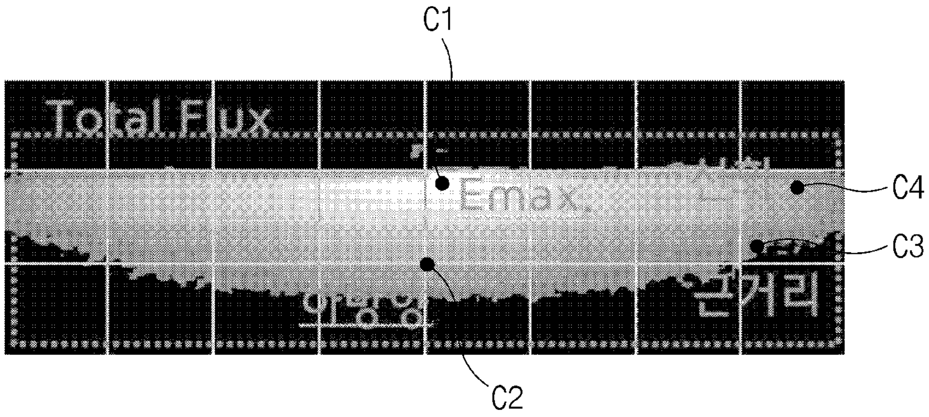
FIG. 14B is a view illustrating light distribution images by a first optical module and a second optical module according to an embodiment of the present disclosure.
Figure 14C:
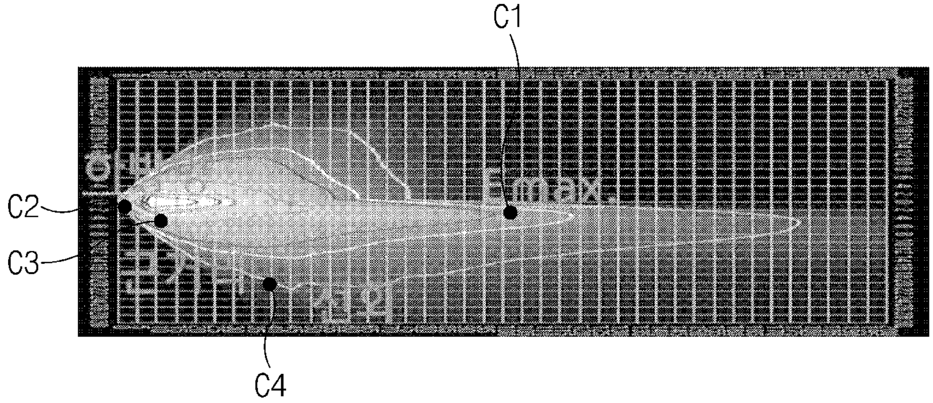
FIG. 14C is a view illustrating road surface pattern image by a first optical module and a second optical module according to an embodiment of the present disclosure.

FIG. 11 is a view illustrating a light distribution image (an upper side) by the first optical module, and a light emission image (a lower side) of a first output lens part according to an embodiment of the present disclosure, FIG. 12 is a table representing ray tracing, a light distribution image, and the second light emitting surface image according to a second vertical focal distance f2, FIG. 13 is a table representing ray tracing, a second light emitting surface image, and a light distribution image according to a shape of a second input surface, FIG. 14A is a view illustrating light emission images of a first output surface and a second output surface according to an embodiment of the present disclosure, FIG. 14B is a view illustrating light distribution images by the first optical module and the second optical module according to an embodiment of the present disclosure, and FIG. 14C is a view illustrating road surface pattern image by a first optical module and a second optical module according to an embodiment of the present disclosure.

A lamp 10 for a vehicle according to an embodiment may be used for a purpose of a lighting function (for example, a headlamp or a fog lamp) or may be used for a purpose of a signal function (for example, a turn signal lamp, a tail lamp, a brake lamp, or a side marker), and the present disclosure is neither limited nor restricted by the purposes. For example, the lamp 10 for a vehicle according to an embodiment of the present disclosure may be used as headlamps for a vehicle, which are mounted on a front left side and a front right side of the vehicle. An embodiment of the present disclosure may correspond to a headlamp that may irradiate a low beam, or may irradiate a low beam and a high beam, at the same time or individually.

Referring to FIGS. 1 to 14, the lamp for a vehicle according to an embodiment of the present disclosure includes a first optical module and a second optical module.

Furthermore, an embodiment of the present disclosure may further include a third optical module.

An embodiment of the present disclosure may include a first optical module 100 and a second optical module 200, or may include all of the first optical module 100, the second optical module 200, and a third optical module 300. Hereinafter, in the illustrated embodiment, an example of the present disclosure including all of the first optical module 100, the second optical module 200, and the third optical module 300 will be described. However, the embodiment of the present disclosure is not limited.

The first optical module 100 is configured to form a first light distribution pattern, and includes a first light source part 110, and a first output lens part 140 that is configured to output light that is input from the first light source part 110. Furthermore, the second optical module 200 is configured to form a second light distribution pattern having light distribution characteristics that are different from those of the first light distribution pattern, and includes a second light source part 210, and a second output lens part 240 that is configured to output the light that is input from the second light source part 210.

Furthermore, the third optical module 300 is configured to form a third light distribution pattern, and includes a third light source part 310, and a third output lens part 340 that is configured to output the light that is input from the third light source part 310.

Here, the first optical module 100, the second optical module 200, and the third optical module 300 may be arranged in an upward/downward direction, and the first output lens part 140, the second output lens part 240, and the third output lens part 340 may be arranged in the upward/downward direction, and may be integrally formed. FIGS. 1 to 9, "V" means a vertical direction (the upward/downward direction) with respect to a ground surface, and "H" means a horizontal direction (a leftward/rightward direction).

Meanwhile, the first light distribution pattern and the second light distribution pattern may overlap each other to form a low beam light distribution pattern. Furthermore, the third light distribution pattern may be configured to form a high beam light distribution pattern.

For example, the first light distribution pattern may be, among low beam light distribution patterns, a hot-zone light distribution pattern for securing a field of view of a central area of a front side of the vehicle. Furthermore, the second light distribution pattern may be, among low beam light distribution patterns, a wide-zone light distribution pattern for securing a field of view of a peripheral area of the front side of the vehicle and securing a visibility during a turn.

Furthermore, the third light distribution pattern may be a high beam light distribution pattern that is a high beam that may irradiate light to a remote distance on the front side of the vehicle.

In detail, the first optical module 100 is configured to form the first light distribution pattern, and includes the first light source part 110, the first output lens part 140, and a first condensing lens part 120.

Various elements or devices that may emit light may be used as the first light source part 110. For example, the first light source part 110 may include a light source and a board. For example, the light source may be a light emitting diode (hereinafter, will be referred to as an LED), and the board may be a printed circuit board (PCB). However, a configuration of the first light source part 110 is not limited thereto.

The first output lens part 140 may be configured to output the light that is input from the first light source part 110. The first output lens part 140 may be configured to form the first light distribution pattern by projecting the light irradiated from the first light source part 110.

The first condensing lens part 120 may be configured to condense the light that is emitted from the first light source part 110. The light irradiated from the first light source part 110 may be output to a front side after being condensed by the first condensing lens part 120 and passing through the first output lens part 140.

The second optical module 200 is configured to form the second light distribution pattern, and includes the second light source part 210, the second output lens part 240, and a second condensing lens part 220.

The second light source part 210, for example, may include a light source and a board. For example, the light source may be a light emitting diode (hereinafter, will be referred to as an LED), and the board may be a printed circuit board (PCB). However, a configuration of the second light source part 210 is not limited thereto.

The second output lens part 240 may be configured to output the light that is input from the second light source part 210. The second output lens part 240 may be configured to form the second light distribution pattern with the light that is emitted from the second light source part 210.

The second condensing lens part 220 may be configured to condense the light that is emitted from the second light source part 210. It may be configured to condense the light that is emitted from the second light source part 210. The light irradiated from the second light source part 210 may be output after being condensed by the second condensing lens part 220 and then passing through the second output lens part 240.

The third optical module 300 is configured to form the third light distribution pattern, and includes the third light source part 310, the third output lens part 340, and a third condensing lens part 320.

The third light source part 310, for example, may include a light source and a board. For example, the light source may be a light emitting diode (hereinafter, will be referred to as an LED), and the board may be a printed circuit board (PCB). However, a configuration of the third light source part 310 is not limited thereto.

The third output lens part 340 may be configured to output the light that is input from the third light source part 310. The third output lens part 340 may be configured to form the third light distribution pattern with the light that is emitted from the third light source part 310.

The third condensing lens part 320 may be configured to condense the light that is emitted from the third light source part 310. It may be configured to condense the light that is emitted from the third light source part 310. The light irradiated from the third light source part 310 may be output after being condensed by the third condensing lens part 320 and then passing through the third output lens part 340.

As described above, the first optical module 100, the second optical module 200, and the third optical module 300 may be arranged in the upward/downward direction, and the first output lens part 140, the second output lens part 240, and the third output lens part 340 may be integrally formed in the upward/downward direction.

The lamp 10 for a vehicle according to an embodiment of the present disclosure is an optical system that extends in the upward/downward direction, and may implement both of a high beam light distribution pattern and a low beam light distribution pattern. According to the present disclosure, the first output lens part 140, the second output lens part 240, and the third output lens part 340 are integrally formed whereby a lighting image having a continuous line image with no intermittent texture in a lighting state may be formed.

Accordingly, according to an embodiment of the present disclosure, a design of the lamp may be differentiated, and thus, a competitiveness of the product may be increased.

Meanwhile, the first optical module 100 may further include a first shield part 130 that is provided between the first condensing lens part 120 and the first output lens part 140 and is configured to shield a portion of the light. Furthermore, the second optical module 200 may further include a second shield part 230 that is provided between the second condensing lens part 220 and the second output lens part 240 and is configured to shield a portion of the light.

The first shield part 130 and the second shield part 230 may include a stepped cut-off area having a shape corresponding to the cut-off line of the low beam pattern.

In detail, the first shield part 130 may include a cut-off area at an upper end thereof, and may be configured to form the cut-off line in the first light distribution pattern by restricting the light that is irradiated from the first light source part 110. Furthermore, the second shield part 230 may include a cut-off area at an upper end thereof, and may be configured to form the cut-off line in the second light distribution pattern by restricting the light that is irradiated from the second light source part 210.

Meanwhile, the first optical module 100 may further include a first heat dissipating part 150. The first light source part 110 may be mounted on the first heat dissipating part 150 and the first heat dissipating part 150 may be configured to emit heat that is generated by the first light source part 110. The first light source part 110 may include one or a plurality of light sources, and when the number of the light sources is plural, the light sources may be arranged on a front surface of the first heat dissipating part 150 in the upward/downward direction.

The second optical module 200 may further include a second heat dissipating part 250. The second light source part 210 may be mounted on the second heat dissipating part 250 and the second heat dissipating part 250 may be configured to emit heat that is generated by the second light source part 210. The second light source part 210 may include one or a plurality of light sources, and when the number of the light sources is plural, the light sources may be arranged on a front surface of the second heat dissipating part 250 in the upward/downward direction.

The third optical module 300 may further include a third heat dissipating part 350. The third light source part 310 may be mounted on the third heat dissipating part 350 and the third heat dissipating part 350 may be configured to emit heat that is generated by the third light source part 310. The third light source part 310 may include one or a plurality of light sources, and when the number of the light sources is plural, the light sources may be arranged on a front surface of the third heat dissipating part 350 in the upward/downward direction.

Here, the first heat dissipating part 150, the second heat dissipating part 250, and the third heat dissipating part 350 may be disposed in the upward/downward direction, and may be integrally formed. Accordingly, the present disclosure may implement an optical system that extends in the upward/downward direction to form a lighting image having a longitudinal shape.

As described above, this may be allowed by the first condensing lens part 120, the second condensing lens part 220, and the third condensing lens part 320, which condense the light that is irradiated to a front side. For example, when a scheme of condensing the light irradiated from the light source and causing the light to face a front side is a conventional technology using an ellipse reflection surface, the light source irradiates the light not to the front side but to an upper side and the like, and in this case, the first light source part, the second light source part, and the heat dissipating member, in which the second light source part is installed, cannot employ a heat sink having a longitudinally long shape.

The present disclosure includes the first condensing lens part 120, the second condensing lens part 220, and the third condensing lens part 320, which perform both of functions and a refractive lens and a condensing lens, and may condense the light irradiated from the light source to a front side of the car line and cause the light to face the front side.

Accordingly, according to the present disclosure, as illustrated, a type, in which the first heat dissipating part 150, the second heat dissipating part 250, and the third heat dissipating part 350 extend in the upward/downward direction and are integrally formed, may be applied. Furthermore, the heat dissipating fins provided in the first heat dissipating part 150, the second heat dissipating part 250, and the third heat dissipating part 350 may be designed in a direction of the car line. Here, the car line means a forward/rearward line of the vehicle with respect to a travel direction of the vehicle.

However, the present disclosure is not limited to the case, in which the first heat dissipating part 150, the second heat dissipating part 250, and the third heat dissipating part 350 are integrally formed, and the first heat dissipating part 150, the second heat dissipating part 250, and the third heat dissipating part 350 may be arranged in a longitudinal direction after being separately formed and assembled (see FIG. 20).

The first output lens part 140 may include a first input surface 141, to which the light is input, and a first output surface 143, from which the light is output, the second output lens part 240 may include a second input surface 241, to which the light is input, and a second output surface 243, from which the light is output, and the third output lens part 340 may include a third input surface 341, to which the light is input, and a third output surface 343, from which the light is output.

Here, the first output surface 143, the second output surface 243, and the third output surface 343 may be multi-facet lenses (MFSs). Accordingly, the lamp 10 for a vehicle may enhance light diffusion efficiency and implement surface light emission.

Furthermore, the first output surface 143, the second output surface 243, and the third output surface 343 may have corresponding shapes.

In detail, a plurality of first optical modules 100, a plurality of second optical modules 200, and a plurality of third optical modules 300 may be provided. For example, as in the embodiment illustrated in FIG. 3, two first optical modules 100 and two second optical modules 200 are provided and four third optical modules 300 are provided, the first output lens parts 140, the second output lens parts 240, and the third output lens parts 340 may be formed such that eight lenses are integrally formed.

Then, when all of the first output surface 143, the second output surface 243, and the third output surface 343 have different shapes, dissimilar textures may be felt for the modules during the lamp is turned off and an intermittent texture may occur when the lamp is turned on.

Accordingly, according to an embodiment of the present disclosure, the first output surface 143, the second output surface 243, and the third output surface 343 may have corresponding shapes. Here, an aspect that the first output surface 143, the second output surface 243, and the third output surface 343 have corresponding shapes means that the first output surface 143, the second output surface 243, and the third output surface 343 have the same shape or are formed to have shapes that are extremely similar enough such that an ordinary person in the art, to which the present disclosure pertains, determine that they have substantially the same shape.

In this case, when the lamp is turned on or off, intermittent textures between the optical modules may be minimized. Furthermore, light distribution patterns having different light distribution characteristics may be implemented by the optical modules by differently designing the shapes of the first input surface 141, the second input surface 241, and the third input surface 341.

In detail, the first input surface 141, the second input surface 241, and the third input surface 341 may have different shapes.

Accordingly, the optical characteristics of the optical modules may become different. Differences between characteristics, such as focuses, of the first output lens part 140, the second output lens part 240, and the third output lens part 340, which will be described hereinafter may be caused by the differences between the shapes of the first input surface 141, the second input surface 241, and the third input surface 341. Furthermore, the optical performances of the optical modules may be different according to focal locations of the first to third condensing lens parts 120, 220, and 320 and the first to third output lens parts 140, 240, and 340.

To optimize an optical design of the lamp for a vehicle, light emission uniformity, inter-module distances, and the like of the first to third output surfaces 143, 243, and 343 may become important factors. However, according to the first optical module 100 and the second optical module 200, which form low beams, it may be difficult for the second output lens part 240 to satisfy both of the optical performance and the uniformity of the second output surface as compared with the first output lens part 140.

This is because it becomes difficult to implement a uniform light emission image in the second output surface when the distribution of the light sources is designed to satisfy the optical performance of a wide zone in the second optical module. Because the first optical module implements a hot zone having a small light distribution area, a design for satisfying a light distribution while securing a uniformity of the first output surface is easy (see FIG. 11), whereas because the second optical module has a wide light distribution area, a design for satisfying both a light distribution and a uniformity of the second output surface is difficult (see FIG. 12).

In this way, when a light emission uniformity of the second output surface that is an output surface in the lamp is insufficient, in which the output lens parts are integrally formed in the upward/downward direction, an intermittent texture may occur on a light output surface of the lamp for a vehicle when the lamp is turned on, and thus, a competitiveness of the product in design may be weakened. Accordingly, it is necessary to improve a technology for enhancing a uniformity of the light emission distribution of the second output surface while satisfying an optical performance of the second optical module.

First, referring to FIGS. 5 to 8, a configuration for improving a vertical light emission image of the second output lens part 240 will be described.

In the present disclosure, a distance f2 from the second output lens part 240 to a vertical focus Fv2 of the second output lens part 240 is smaller than a distance f1 from the first output lens part 140 to a vertical focus Fv1 of the first output lens part 140 (f1>f2).

For convenience of description, a distance from an imaginary reference plane RF1 of the first output lens part 140 to the vertical focus Fv1 of the first output lens part 140 will be referred to the first vertical focal distance f1, and a distance from an imaginary reference plane RF2 of the second output lens part 240 to the vertical focus Fv2 of the second output lens part 240 will be referred to the second vertical focal distance f2.

Here, the imaginary reference plane RF1 of the first output lens part 140 may be a plane that is obtained by extending a string connecting an upper end and a lower end of the first input surface 141 in the leftward/rightward direction of the first output lens part 140 in a vertical cross-section including a center of the first output lens part 140 (see FIG. 5). Furthermore, the imaginary reference plane RF2 of the second output lens part 240 may be a plane that is obtained by extending a string connecting an upper end and a lower end of the second input surface 241 in the leftward/rightward direction of the second output lens part 240 in a vertical cross-section including a center of the second output lens part 240 (see FIG. 6).

When the second vertical focal distance f2 is designed to be shorter, a distribution of the light that is input to the second input surface 241 may become wider and more uniform. In this case, a uniform light emission image may be implemented as the light that is output from the second output surface 243 also is uniformly emitted from the second output surface 243.

Accordingly, an embodiment of the present disclosure may implement a continuous light emission image with no intermittent texture between the first output surface 143 and the second output surface 243 by supplementing the uniformity of the second output surface 243 by designing the second vertical focal distance f2 such that the second vertical focal distance f2 is shorter than the first vertical focal distance f1.

Here, a range of the second vertical focal distance f2 as compared with the first vertical focal distance f1 may be considered to be a suitable range in consideration of both of performance and a light distribution image. That is, it is necessary to design the second vertical focal distance f2 such that the second vertical focal distance f2 is shorter than the first vertical focal distance f1 and such that the light distribution image is uniform while a performance for implementing the wide zone of the low beam is satisfied.

FIG. 12 is a table representing ray tracing, the light distribution image, and an image of the second output surface 243 according to the second vertical focal distance f2.

In A1, the second vertical focal distance f2 is 25 mm, in A2, the second vertical focal distance f2 is 25 mm, in A3, the second vertical focal distance f2 is 20 mm, and in A4, the second vertical focal distance f2 is 15 mm. Furthermore, in A1, the ray is distributed in an upward direction of the focus to satisfy a downward distribution of the light distribution image.

In A1, the light distribution performance is satisfied but the light emission image of the second output surface 243 is not uniform, and in A2 in which the ray gathers at the focus, the uniformity of the light emission image is satisfied but the intensity of the light in a lower area of the light distribution image is insufficient and thus the performance is not satisfied. In A4, it is identified that the light distribution performance is satisfied but the uniformity of the light emission image is insufficient. As a result, it is identified that, when the second vertical focal distance f2 is 20 mm, the uniformity is satisfied while the light distribution performance is satisfied.

Next, referring to the embodiment illustrated in FIGS. 7, 9, and 10, a configuration for improving the horizontal (leftward/rightward) direction light emission image of the second output lens part 240 will be described.

A horizontal focus FH2 of the second output lens part 240 may be formed in an interior of the second output lens part 240 (see FIG. 10).

In detail, the second output lens part 240 may be designed such that the horizontal focus FH2 is formed between the second input surface 241 and the second output surface 243. A structure, in which the light that is input to the second input surface 241 is spread after the focus is formed in an interior of the second output lens part 240 with respect to the horizontal direction of the second optical module 200, may be designed. Due to the structure, the light may be uniformly distributed on the second output surface 243 to implement a uniform light emission image.

However, for example, when the focus by the light input to the input surface is formed on an outside of the output surface, the light may be distributed narrowly on the output surface. In detail, the light input to the input surface may be refracted by a curvature of the input surface such that the focus is formed on an outside in an output direction of the output surface, and in this case, because the light is not spread on the output surface, the light is distributed narrowly on the output surface. In this case, it is difficult to implement the uniform light emission image because the light is not limited at left/right peripheries of the output surface.

Accordingly, the second output lens part 240 according to an embodiment of the present disclosure may implement a uniform light emission image as the light is spread on the second output surface 243 because the horizontal focus FH2 is formed in an interior of the second output lens part 240.

In this way, a curvature of the second input surface 241 has to be formed small to form the focus in the interior of the second output lens part 240. In an embodiment of the present disclosure, the second input surface 241 may be implemented by a plurality of unit input surfaces 241*a* to form an input surface having a small curvature.

In detail, the second input surface 241 includes the plurality of unit input surfaces 241*a*, and the plurality of unit input surfaces 241*a* may be arranged in the leftward/rightward direction. For reference, one unit input surface 241*a* is illustrated in the perspective view illustrated in FIG. 7.

Furthermore, in a horizontal cross-section of the second output lens part 240, each of the unit input surfaces 241*a* may have a curved shape that is convex in a direction that faces the second light source part 210.

In detail, the second input surface 241 may include the unit input surface 241*a* that is convex in a direction that faces the second light source part 210 with respect to the horizontal direction, and the plurality of unit input surfaces 241*a* may be repeatedly formed along the leftward/rightward direction.

Due to the structure, the lights that are input to the unit input surfaces 241*a* and are output through the second output surface 243 may overlap each other. Accordingly, because the light is uniformly distributed on the second output surface 243, a uniform light emission image may be implemented.

For example, referring to FIGS. 9 and 10, the plurality of unit input surfaces 241*a* may have the same shape. That is, the second input surface 241 may have a structure, in which the unit input surfaces 241*a* having the same shape are continuous in the leftward/rightward direction.

However, the shape of the second input surface 241 is not limited to the embodiment, in which the plurality of unit input surfaces 241*a* have the same shape, and the plurality of unit input surfaces 241*a* may be formed differently as long as the technical features of the present disclosure may be implemented.

Meanwhile, a curvature of each of the unit input surfaces 241*a* may be formed such that an output angle (θ) of the light that is output from the second output surface 243 ranges from 30 degrees to 90 degrees. In detail, the curvature of each of the unit input surfaces 241*a* may be designed such that the output angle (θ) of the light that is output after the focus is formed in the interior of the second output lens part 240 is 30 degrees or more (see FIG. 10).

In this way, because the output angle (θ) of the light output from the second output surface 243 is designed to be 30 degrees or more, the light may be spread more on the second output surface 243. Accordingly, an overlapping amount of the lights input through the plurality of unit input surfaces 241*a* may be increased, and thus, a uniform light emission image may be implemented on the second output surface 243.

FIG. 13 is a table representing ray tracing, a light emitting surface of the second output surface 243, and a light distribution image according to a shape of the second input surface 241.

B1 is a comparative example, and corresponds to a case, in which the second input surface includes one input surface, and B2 to B5 illustrate the embodiments of the present disclosure, and correspond to cases, in which the second input surface 241 includes the plurality of unit input surfaces 241*a*.

A radius of curvature of the second input surface of B1 is 10 mm, and a conic constant is −1. B2 corresponds to a case, in which the second input surface 241 includes five unit input surfaces 241*a*, and a radius of curvature of the unit input surface 241*a* is 2 mm and a conic constant is 0. B3 corresponds to a case, in which the second input surface 241 includes nine unit input surfaces 241*a*, and a radius of curvature of the unit input surface 241*a* is 1.2 mm and a conic constant is 0. B4 corresponds to a case, in which the second input surface 241 includes eleven unit input surfaces 241*a*, and a radius of curvature of the unit input surface 241*a* is 1.1 mm and a conic constant is 0. B5 corresponds to a case, in which the second input surface 241 includes fifteen unit input surfaces 241*a*, and a radius of curvature of the unit input surface 241*a* is 1.1 mm and a conic constant is −1.

Through the illustrated experimental examples, it may be identified that a uniform light emission image is implemented while the light distribution performance of the second output surface 243 is satisfied in B5, in which the curvature of the unit input surfaces 241*a* that constitutes the second input surface 241 is largest and the number of the unit input surfaces 241*a* is large.

FIG. 14A is a view illustrating light emission images of the first output surface 143 and the second output surface 243 according to an embodiment of the present disclosure. As in the illustrated drawing, a continuous light emission image may be implemented on the first output surface 143 and the second output surface 243.

FIG. 14B is a view illustrating light distribution images by the first optical module 100 and the second optical module 200 according to an embodiment of the present disclosure, and FIG. 14C is a view illustrating road surface pattern image by the first optical module 100 and the second optical module 200 according to an embodiment of the present disclosure.

As in the illustrated drawings, according to the embodiment of the present disclosure, it may be identified that a light distribution performance for implementing a low beam is satisfied. C1, C2, C3, and C4 on the light distribution image of FIG. 14B indicate the same points as C1, C2, C3, and C4 of the road-surface pattern image, and C1 is a point Emax (for example, about 35400 cd), at which an intensity of light is maximal.

According to an embodiment of the present disclosure, a light distribution performance may be satisfied in the lamp for a vehicle that extends in a vertical direction, and also a uniform light emission image may be implemented on a surface, from which light is emitted.

Accordingly, according to the present disclosure, a design of the lamp for a vehicle may be differentiated, and thus, a competitiveness of the product may be increased.

Although the specific embodiments of the present disclosure have been described above, the spirits and range of the present disclosure are not limited thereto, and the present disclosure may be variously corrected and modified by an ordinary person in the art, to which the present disclosure pertains, while not changing the essence of the present disclosure described in the claims.

What is claimed is:

1. A lamp for a vehicle, comprising:

a first optical module configured to form a first light distribution pattern, and comprising a first light source part and a first output lens part configured to output light input from the first light source part; and a second optical module configured to form a second light distribution pattern having light distribution characteristics that are different from those of the first light distribution pattern, and comprising a second light source part and a second output lens part configured to output light input from the second light source part, wherein:

the first optical module and the second optical module are arranged in an upward/downward direction, the first light distribution pattern and the second light distribution pattern overlap each other to implement a low beam, and a distance from the second output lens part to a vertical focus of the second output lens part for a predefined light wavelength is smaller than a distance from the first output lens part to a vertical focus of the first output lens part for the predefined light wavelength wherein:

the first output lens part comprises a first input surface, to which the light is input, and a first output surface from which the light is output, the second output lens part includes a second input surface, to which the light is input, and a second output surface, from which the light is output, the first output lens part and the second output lens part are integrally formed in the upward/downward direction, the first output surface and the second output surface comprise multi-facet lenses, the second input surface includes a plurality of unit input surfaces, the plurality of unit input surfaces are arranged along a leftward/rightward direction, each of the unit input surfaces has a curved shape that is convex in a direction facing the second light source part on a horizontal cross-section of the second output lens part, and wherein the unit input surfaces have the same shape.

2. The lamp of claim 1, wherein a horizontal focus of the second output lens part is formed in an interior of the second output lens part.

3. The lamp of claim 1, wherein curvatures of the unit input surfaces are formed such that an output angle of the light output from the second output surface is within a range from 30 degrees to 90 degrees.

4. The lamp of claim 1, wherein the first optical module further comprises:

a first shield part provided between the first light source part and the first output lens part, and configured to shield a portion of the light, wherein the second optical module further comprises:

a second shield part provided between the second light source part and the second output lens part, and configured to shield a portion of the light, and wherein each of the first shield part and the second shield part has a shape corresponding to a cut-off line of the low beam.

5. The lamp of claim 2, further comprising:

a third optical module configured to form a third light distribution pattern, and comprising a third light source part, and a third output lens part configured to output a light input from the third light source part, wherein:

the third light distribution pattern has light distribution characteristics that are different from those of the first light distribution pattern and the second light distribution pattern, and implements a high beam, the third optical module is arranged in the upward/downward direction together with the first optical module and the second optical module, and the third output lens part is integrally formed with the first output lens part and the second output lens part.

* * * * *